United States Patent
Audeon et al.

(10) Patent No.: US 8,133,013 B2
(45) Date of Patent: Mar. 13, 2012

(54) STAGE OF A TURBINE OR COMPRESSOR, PARTICULARLY FOR A TURBOMACHINE

(75) Inventors: David Audeon, Massy (FR); David Da Silva, Juvisy sur Orge (FR)

(73) Assignee: SNECMA, Paris (FR)

( * ) Notice: Subject to any disclaimer, the term of this patent is extended or adjusted under 35 U.S.C. 154(b) by 692 days.

(21) Appl. No.: 12/257,761

(22) Filed: Oct. 24, 2008

(65) Prior Publication Data
US 2009/0123278 A1    May 14, 2009

(30) Foreign Application Priority Data
Nov. 13, 2007 (FR) .................................. 07 07946

(51) Int. Cl.
*F01D 11/08* (2006.01)
(52) U.S. Cl. ...................... 415/173.1; 415/173.7
(58) Field of Classification Search ............... 415/173.1, 415/173.7, 214.1
See application file for complete search history.

(56) References Cited

U.S. PATENT DOCUMENTS

| 5,848,854 | A | 12/1998 | Brackett |
| 6,435,820 | B1 * | 8/2002 | Overberg ................ 415/138 |
| 7,360,989 | B2 * | 4/2008 | Amiot et al. ............. 415/138 |
| 7,600,967 | B2 * | 10/2009 | Pezzetti et al. ........... 415/173.1 |
| 2006/0216146 | A1 | 9/2006 | Thompson et al. |
| 2006/0245924 | A1 * | 11/2006 | Audeon et al. ........... 415/214.1 |

FOREIGN PATENT DOCUMENTS

| EP | 0 907 053 A2 | 4/1999 |
| EP | 907053 A2 * | 4/1999 |
| EP | 1 099 826 A1 | 5/2001 |
| EP | 1 840 339 A1 | 10/2007 |
| FR | 2 887 920 A1 | 1/2007 |

OTHER PUBLICATIONS

U.S. Appl. No. 12/266,929, filed Nov. 7, 2008, Audeon, et al.
U.S. Appl. No. 12/266,813, filed Nov. 7, 2008, Audeon, et al.

* cited by examiner

*Primary Examiner* — Benjamin Sandvik
*Assistant Examiner* — Joseph Schoenholtz
(74) *Attorney, Agent, or Firm* — Oblon, Spivak, McClelland, Maier & Neustadt, L.L.P.

(57) ABSTRACT

A stage of a turbine or compressor for a turbomachine including at least a vane disk surrounded with a sectorized ring supported by a casing and including a circumferential flange radially clamped on a rail of the casing by substantially C-shaped cross-section locks which are axially engaged on the casing rail and the flange of the ring is disclosed. The inner and outer walls of each lock includes radial bearing surfaces on the flange of the ring and the casing rail, respectively. The bearing surfaces only extend on a part of the width of the lock.

15 Claims, 2 Drawing Sheets

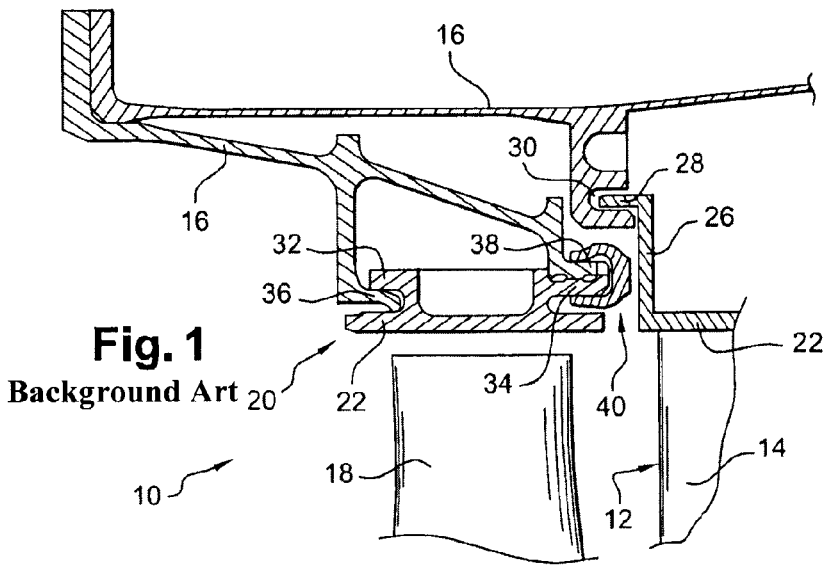
Fig. 1
Background Art
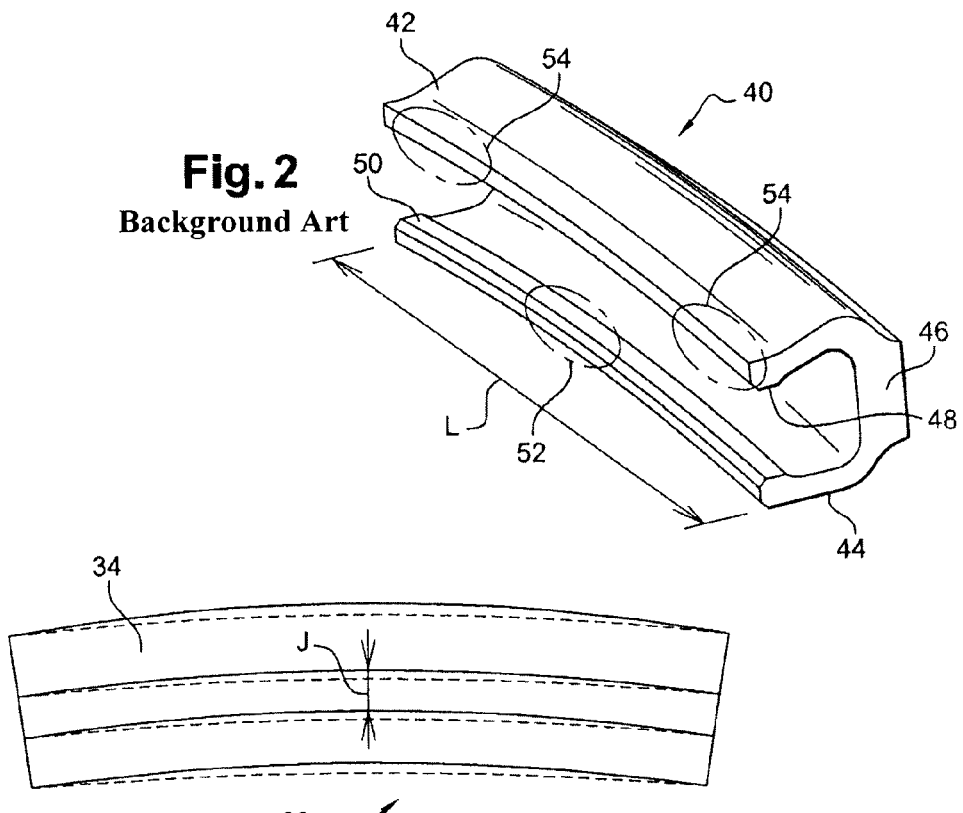
Fig. 2
Background Art
Fig. 3
Background Art

STAGE OF A TURBINE OR COMPRESSOR, PARTICULARLY FOR A TURBOMACHINE

The present invention relates to a stage of a turbine or compressor, particularly for a turbomachine, such as a plane turbojet or turbojet prop, comprising a vane disk rotating in a cylindrical or frusto-conical ring formed by ring sectors circumferentially hooked in an abutting manner on a casing of the compressor or turbine.

TECHNOLOGICAL BACKGROUND OF THE INVENTION

Each ring sector comprises a circumferential flange at one end thereof, which is radially clamped on an annular rail of the casing through a substantially C-shaped cross-section resilient lock which is axially engaged on the casing rail and the circumferential flange of the ring sector.

The lock is formed with two circumferentially directed parallel walls, respectively inner and outer, which extend one inside the other and which are connected together by a substantially radial wall. The inner and outer walls of the lock comprise radial supporting or bearing means on the flange of the ring sector and the casing rail, respectively. The lock is engaged on the flange of the sector and on the casing rail with a radial preload. In the idle state of the turbomachine, the inner and outer walls of the lock radially bear on the flange of the ring sector and on the casing rail substantially all along the width or angular extent of the lock.

In the operating state, a temperature gradient relatively substantial in a radial direction appears in each ring sector, which causes a "discambering" of this ring sector. This phenomenon further translates into an increase of the curvature radius of the ring sector, which decreases the radial bearing surfaces between the walls of the lock and the flange of the ring sector and the casing rail. It has been noticed that the bearing areas between those pieces were essentially located between the end portions of the outer wall of the lock and the casing rail, and between the median portion of the inner wall of the lock and the ring sector. The stresses communicated by the ring sector and the casing rail pass in transit through those bearing areas which are not optimized and then form concentration areas for strains capable of reducing the lifetime of the lock.

SUMMARY OF THE INVENTION

The invention notably aims to provide a simple, efficient and cost effective solution to this problem.

The invention proposes therefore a stage of a turbine or compressor, particularly for a turbomachine, comprising at least a vane disk surrounded with a sectorised ring supported by a casing and comprising a circumferential flange radially clamped on an annular rail of the casing by substantially C-shaped cross-section locks which are axially engaged on the casing rail and the flange of the ring, each lock having two circumferentially directed parallel walls, respectively inner and outer, connected together by a radial wall, the inner and outer walls of the lock comprising radial supporting or bearing means on the flange of the ring sector and the casing rail, respectively, wherein those bearing means only extend on a part of the width or angular extent of the lock.

According to the invention, the radial bearing means of the lock are formed by selected portions of the inner and outer walls of the lock, those portions being optimized to permanently stay in contact with the casing or the ring sector, and whatever the operating state of the turbomachine. Those portions are well contoured and configured to withstand the stresses communicated by casing rail and the flange of the ring sector when operating, which allows for the increased lifetime of the lock.

According to another feature of the invention, the inner and outer walls of the lock each comprise at least one portion of greater dimension in an axial direction and at least one portion of smaller dimension in an axial direction, the, or each, portion of greater dimension having said radial bearing means.

The inner and outer walls of the lock are configured to well dissociate the working portions (of greater axial dimension) of the lock which have the radial bearing means and the non-working portions (of smaller radial dimension) thereof. The portions of smaller axial dimension of the walls of the lock are formed for example by serrations provided in those walls. For example, the serrations are formed by removal of material from the inner and outer walls of the lock where there are neither stresses communicated nor concentration areas of strains. The material is then better distributed in the walls of the lock than in the prior technique, which notably allows for the weight of the locks in one stage of the compressor or turbine to be reduced. Furthermore, this localized removal of material allows for the stiffness of the lock to be locally modified and permits it to adapt to the deformations of the ring sector when operating.

The inner and/or outer wall of the lock comprises for example a median portion of smaller axial dimension and end portions of greater axial dimension.

When the inner and outer walls of the lock each comprise one median portion of smaller axial dimension and end portions of greater axial dimension, the stresses communicated between the ring sectors and the lock and between the casing rail and the lock are localized on the end portions of the inner and outer walls of the lock. The median portion of the inner wall of the lock does therefore not contact the flange of the ring sector which is then free to freely displace in a radial direction. Therefore, in that case, the lock has a greater lifetime.

Alternatively or as an additional feature, the inner and/or outer wall of the lock comprises a median portion of greater axial dimension and circumferential end portions of smaller axial dimension.

When the inner wall of the lock comprises a median portion of greater axial dimension and end portions of smaller axial dimension, the median portion of this wall is configured to withstand the substantial stresses communicated by the flange of the ring sector and to limit the discambering of this sector. As a result, small variations of the radial backlash between the crests of the vanes and the ring sectors are provided for, which improves the performances of turbomachine.

The, or each, portion of greater axial dimension of each wall of the lock can have a width or angular extent which makes up about a half, preferably a third, and for example a quarter, of the that of the lock.

Furthermore, the invention relates to a compressor or a turbine for a turbomachine, wherein it comprises at least a stage of a turbine or a compressor such as described above.

The invention as well relates to a turbomachine, such as a plane turbojet or turbojet prop, wherein it comprises at least a stage of a turbine or a compressor such as described above.

The invention finally relates to a lock for a stage of a turbine or a compressor of the aforesaid type, comprising two circumferentially directed parallel walls, respectively inner and outer, connected together at one circumferential edge thereof by a third substantially radial wall so that the lock has a substantially C-shaped cross-section, wherein the inner and outer walls each comprise at least one serration, at the other circumferential edges thereof, which extends in a circumferential direction along a part, and for example at least along a quarter, of the width or angular extent of the lock, the non-serrated portions of those walls having radial bearing means.

BRIEF DESCRIPTION OF THE DRAWINGS

The invention will be more fully understood and other features, details and advantages thereof will more clearly appear when reading the following description, given by way of non-limiting example and with reference to the accompanying drawings, in which :

FIG. 1 is an axial, partial sectional schematic half view of a turbine stage according to the prior technique;

FIG. 2 is a perspective schematic view of a lock of a stage of FIG. 1;

FIG. 3 is a partial very schematic front view of a ring sector of FIG. 1, viewed from downstream;

DETAILED DESCRIPTION

Figure 4:
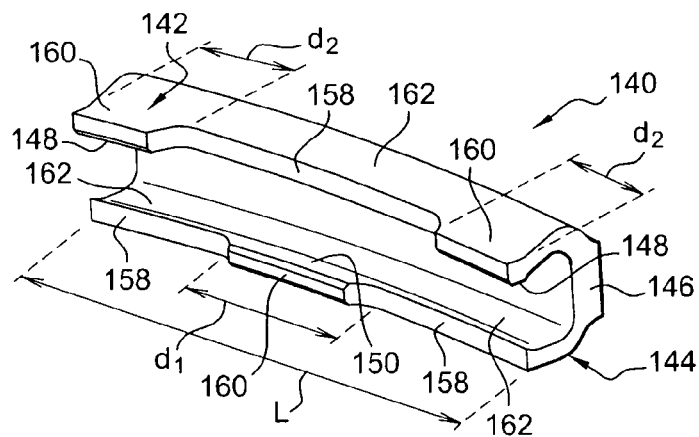
FIG. 4 is a schematic perspective view of a lock according to the present invention.

Referring first to FIG. 1, it shows a turbine stage 10 for a turbomachine such as a plane turbojet or turbojet prop, this stage 10 comprising a distributor 12 formed of an annular row of fixed vanes 14 supported by a casing 16 of the turbine, and a vane disk 18 mounted upstream from the distributor 12 and rotating in a sectorised ring 20 formed of a plurality of sectors 22 which are circumferentially hooked in an abutting manner on the casing 16 of the turbine.

The distributor 12 comprises two respectively inner 24 and outer (not shown) revolving walls, which delimit therebetween the annular flow of gases in the turbine and between which the vanes 14 radially extend. The fixing means of the distributor comprise at least one radial upstream tab 26 connected, at its outer periphery, to a cylindrical edge 28 upstream directed and adapted to be engaged in an annular groove 30 directed downstream from the casing 16.

Each ring sector 22 comprises circumferential flanges 32, 34 hooking on the casing 16 of the turbine at its upstream and downstream ends. The circumferential upstream flanges 32 of the ring sectors are directed upstream and engage on a cylindrical flange 36 directed downstream from the casing 16. The circumferential downstream flanges 34 of the sectors are directed downstream and are radially clamped on a cylindrical rail 38 of the casing by means of substantially C-shaped cross-section locks 40, the opening of which is axially upstream directed, and which are axially engaged from downstream on the casing rail 38 and the circumferential downstream flanges 34 of the ring sectors by elastic deformation. The downstream flanges 34 of the ring sectors and the rail 38 of the casing have substantially the same curvature radius in the idle state of the turbomachine.

Each lock 40, as better shown in FIG. 2, comprises two circumferential parallel walls 42 and 44, respectively radially outer and inner, which are connected together at their downstream ends by a radial wall 46, and which are respectively engaged on the outer part of the casing rail 38 and on the inner part of the downstream flanges 34 of the ring sectors.

The radial wall 46 of the lock 40 is axially interposed between the downstream ends of the rail 38 and flanges 34 on one hand and the radial wall 26 of the downstream located distributor 12 on the other hand, in order to prohibit a downstream axial displacement and a disengagement of the lock 40 from the casing rail 38 and from the flanges 34 of the ring sectors.

On the side opposite to the radial wall 46, the outer 42 and inner 44 walls of the lock comprise bearing means respectively on the casing rail 38 and the flanges 34 of the sector. The outer wall 42 comprises an inner bearing surface 48 on the casing rail 38, and the inner wall 44 comprises an outer bearing surface 50 on the flange 34 of the ring sector, those surfaces 48, 50 extending all along the width L or angular extent of the lock 40.

The lock 40 is engaged on the casing rail 38 and the circumferential flange 34 of the ring sector with some radial preload. Therefore, the distance in a radial direction between the circumferential walls 42, 44 of the non-mounted lock (corresponding to the radial dimension of the opening of the lock) is smaller, e.g. by about some tenths of a millimeter, than the sum of the thicknesses of the casing rail 38 and the downstream flange 34 of the sector in a radial direction. Then, the lock 40 elastically bends in a radial direction due to the outspreading of its circumferential walls 42, 44 when axially engaging on the rail 38 and the downstream flange 34 of the sector. In the mounting position of the lock and in the idle state of the turbomachine, the whole of the surfaces 48, 50 bears on the casing rail 38 and the flange 34 of the sector, respectively.

When operating, the ring sector 22 is subjected to a substantial temperature gradient in a radial direction, which translates into a "discambering" of the ring sector, the curvature radius of which being then longer than in the free of strain state, its curvature radius becoming greater than that of the casing rail 38. Referring to FIG. 3, it shows in solid line the shape and position of the downstream flange 34 of the ring sector in the free state free of strain and in discontinued line in the "discambered" state. The "discambering" of the ring sector causes an inwardly radial displacement J of the circumferential flange 34 of the ring sector, this displacement J varying along the circumferential dimension of the sector and being maximum at the median portion of this sector, which causes the radial bearing areas between the lock 40 and the rail 38 and the flange 34 to be modified. The inner wall 44 of the lock bears on the flange 34 of the ring sector in an area 52 located at the median portion of this wall, and the outer wall 42 of the lock then bears on the casing rail 38 in areas 54 located at the end portions of this wall 42. As a result, the stresses communicated by the ring sector and the casing rail only pass in transit through one portion of the bearing surfaces 48, 50 of the walls of the lock, which causes concentrations of substantial strains on the corresponding portions of the lock which are not adapted to withstand those strains, and translates into a shorter lifetime of the lock.

The invention permits one to at least partially overcome those drawbacks by means of a lock of which the bearing means are located in predetermined portions of its inner and outer walls, those portions being designed to permanently be in contact with the flange of the ring sector and the casing rail.

In the exemplary embodiment shown in FIG. 4, the walls 142, 144 of the lock comprise serrations 158 on the side opposite to the radial wall 146, which extend on a part of the width L of the lock in a circumferential direction and which delimit portions 160 of greater dimension in an axial direction and portions 162 of shorter dimension in an axial dimension.

The outer wall 142 of the lock 140 comprises a serration 158 in its substantially middle portion, which forms a median portion 162 of shorter axial dimension, and which separates one from the other two end portions 160 of greater axial dimension.

The inner wall 144 of the lock comprises a serration 158 at each end thereof, forming therefore two end portions 162 of shorter axial dimension separated one from the other by a median portion 160 of greater axial dimension.

The portions 160 of greater axial dimension comprise the bearing means on the casing rail 38 and the flange 34 of the ring sector. The median portion 160 of the inner wall 44 comprises an outer bearing wall 150 which extends all along the dimension of this portion in a circumferential direction and which is adapted to be in contact with the median portion of the flange 34 of the ring sector. Each end portion 160 of the outer wall 142 comprises an inner bearing surface 148 which extends all along the circumferential dimension of this portion and which is adapted to be in contact with a corresponding portion of the casing rail 38.

In the example shown, the serrations 158 extend along the free circumferential edges of the walls 142, 144 of the lock and have a relatively small depth in an axial direction and which is for example determined to suppress corresponding portions of the bearing surfaces of the lock 40 of the prior technique.

The median portion 160 of the inner wall 144 of the lock extends for example along a dimension d1 in a circumferential direction which makes up about a third of the width L of the lock. The end portions 160 of the outer wall 142 of the lock each extend along a dimension d2 in a circumferential direction which makes up about the quarter of the width L of the lock.

In that particular configuration of the bearing means of the locks 140 for a stage, the bearing surfaces 150 of the inner walls 144 of the locks are staggered disposed with the bearing surfaces 148 of the outer walls 142 of the locks. Material is maintained at the areas 52, 54 of the walls of the lock 40 of the prior technique, so that a permanent contact of the bearing means is ensured on casing rail and the flange of the ring sector, in the operating state of the turbomachine. Those portions can then be conformed to withstand the stresses communicated by the flange and the rail. In that case, the serrations are only provided to lighten the lock. They further allow for the lock to be more flexible in its flexure so that it can further follows the displacements of the ring sector when operating.

Figure 5:
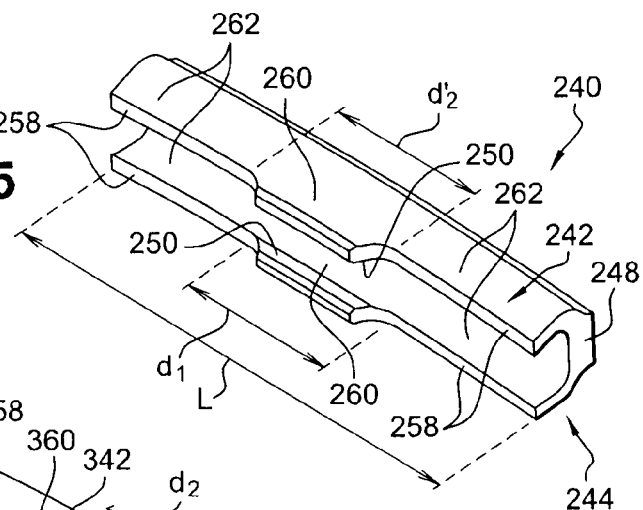
FIG. 5 to 7 are schematic perspective views of alternate embodiments of the invention.

In the alternate embodiment shown in FIG. 5, the inner wall 244 of the lock is similar to that of the lock 140 of FIG. 4.

The outer wall 242 of the lock comprises a serration 258 at each end portion thereof so that two end portions of smaller axial dimension separated one from the other by a median portion of the wall 242 of greater axial dimension are formed.

The median portion 260 of the inner wall 244 comprises an outer surface 250 bearing on the median portion of the flange 34 of the ring sector, and the median portion 260 of the outer wall 242 comprises an inner surface 250 bearing on a corresponding portion of the casing rail 38.

The serrations 258 of the inner wall 244 of the lock are substantially similar to the serrations provided on the outer wall 242. The median portions 260 of the inner and outer walls of the lock have each a dimension d1, d2' in a circumferential dimension which makes up about the third of the width L of the lock.

In the configuration shown in FIG. 5, the bearing means of the locks 140 for one stage are such that the bearing surfaces 250 of the inner walls of the locks are radially aligned with the bearing surfaces 250 of the outer walls of the locks and are located at the median portions thereof. The median portions of each lock which are engaged on the casing rail and the flange of the ring sector with some radial preload counter to discambering of ring sectors when operating, and then to the inwardly radial displacement of the median portion of this ring sector. Therefore, the median portions of the lock are in that case configured, and specifically reinforced relative to the prior technique, to withstand the strains communicated by the ring sector when operating.

Figure 6:
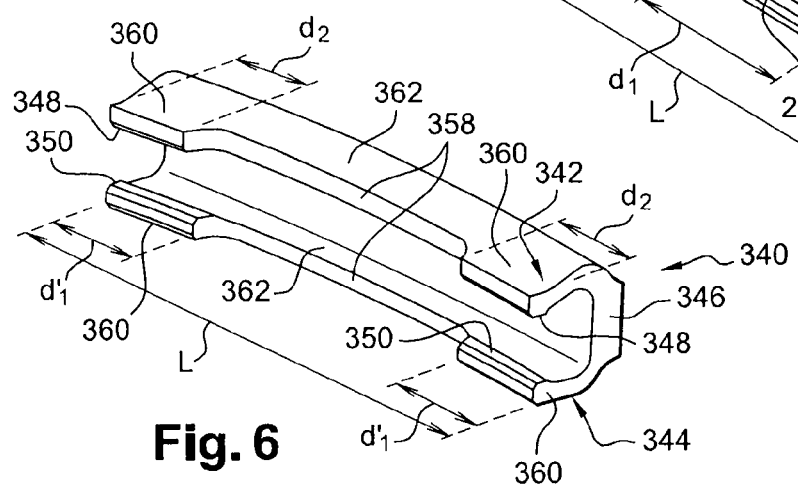

In yet another alternative shown in FIG. 6, the outer wall 342 of the lock 340 is similar to the outer wall 148 of the lock 140 of FIG. 4.

The inner wall 344 of that lock substantially comprises a serration 358 in its middle portion which forms a median portion of smaller axial dimension, and separates one from the other two end portions of greater axial dimension.

The portions 160 of greater axial dimension comprise the bearing surfaces 348, 350 on the casing rail 38 and the flange 34 of the ring sector, respectively.

The end portions 360 of the walls 342, 344 of the lock each have a dimension d1', d2 in a circumferential dimension, which makes up about the quarter of the width L of the lock.

In that configuration, the bearing and radial clamping means are located on the end portions of the ring sector and on corresponding portions of the casing rail. Therefore, the median portion of the ring sector does not contact the lock and is able to freely displace in a radial direction when the turbomachine operates, without communicating strains to the lock which has then a longer lifetime.

Like in the embodiment shown in FIG. 5, the bearing surfaces 350 of the inner wall of the lock are also radially aligned with the bearing surfaces 348 of the outer wall. The bearing surfaces 348, 350 of the lock shown in FIG. 6 are in the number of four instead of a number of two for the lock of FIG. 5.

Figure 7:
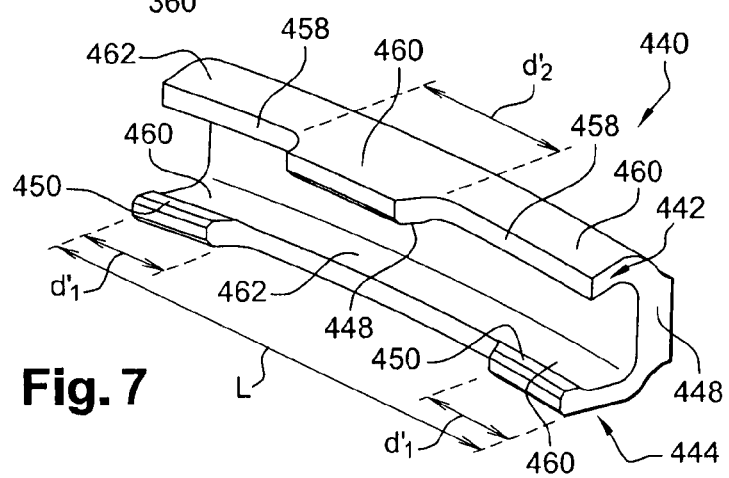

In the alternate embodiment shown in FIG. 7, the outer wall 442 of the lock 440 is similar to the outer wall 242 of the lock 240 of FIG. 5, and its inner wall 444 is similar to the inner wall 344 of the lock 340 shown in FIG. 6.

The lock 440 has substantially the same properties as the lock 340 shown in FIG. 6. The walls of that lock 440 are substantially contrary or opposed shaped relative to that of the lock 140 shown in FIG. 4.

The width L of the locks 140, 240, 340, 440 is substantially similar to that of the lock 40 of the prior technique.

What is claimed is:

1. A stage of a turbine or compressor, comprising:
at least a vane disk surrounded with a sectorised ring supported by a casing and comprising a circumferential flange radially clamped on an annular rail of the casing by substantially C-shaped cross-section locks which are axially engaged on the annular rail and the circumferential flange of the ring, each lock having two circumferentially directed parallel walls, respectively inner and outer, connected together by a radial wall, the inner and outer walls of the lock comprising radial supporting or bearing means on the circumferential flange and the annular rail, respectively,
wherein those bearing means only extend on a part of the circumferential extent of the lock.

2. A stage according to claim 1, wherein each one of the inner and outer walls of the lock comprises at least one portion of greater dimension in an axial direction and at least one portion of smaller dimension in an axial direction, the, or each, portion of greater dimension having said radial bearing means.

3. A stage according to claim 2, wherein the inner wall of the lock comprises a median portion of smaller axial dimension and end portions of greater axial dimension, or a median portion of greater axial dimension and end portions of smaller axial dimension.

4. A stage according to claim 2, wherein the outer wall of the lock comprises a median portion of greater dimension and end portions of smaller axial dimension, or a median portion of smaller axial dimension and end portions of greater axial dimension.

5. A stage according to claim 2, wherein the, or each, portion of greater axial dimension of each lock wall has a circumferential extent which makes up about the half of that of the lock.

6. A stage according to claim 2, wherein the, or each, portion of greater axial dimension of each lock wall has a circumferential extent which makes up about the third of that of the lock.

7. A stage according to claim 2, wherein the, or each, portion of greater axial dimension of each lock wall has a circumferential extent which makes up about the quarter of that of the lock.

8. A stage according to claim 2, wherein the portions of smaller axial dimension of the lock walls are formed by serrations of those walls.

9. A compressor or turbine for a turbomachine comprising at least one stage of turbine or compressor according to claim 1.

10. A turbomachine comprising at least one stage of turbine or compressor according to claim 1.

11. A lock for a stage of a turbine or a compressor according to claim 1, comprising:
  two circumferentially directed parallel walls, respectively inner and outer, connected together at one circumferential edge thereof by a third substantially radial wall so that the lock has a substantially C-shaped cross-section, wherein each one of the inner and outer walls comprises at the other of their circumferential edges thereof at least one portion of greater dimension in an axial direction and at least one portion of smaller dimension in the axial direction, said at least one portion of smaller dimension extending along at least a quarter of the circumferential extent of the lock in a circumferential direction, and said at least one portion of greater dimension having radial bearing means.

12. A stage according to claim 1, wherein the part of the circumferential extent of the lock of the which the bearings means extend is less than the entire circumferential extent of the lock.

13. A stage according to claim 2, wherein the, or each, portion of greater dimension on the inner wall of the lock includes an outer bearing wall which abuts the circumferential flange of the ring, and the, or each, portion of greater dimension on the outer wall of the lock includes an inner bearing wall which abuts the annular rail.

14. A stage according to claim 12, wherein the outer bearing wall circumferentially extends along an entire circumferential dimension of the, or each, portion of greater dimension on the inner wall.

15. A stage according to claim 12, wherein the inner bearing wall circumferentially extends along an entire circumferential dimension of the, or each, portion of greater dimension on the outer wall.

* * * * *